3,069,448
PROCESS FOR THE MANUFACTURE OF TRIPHENYL TIN CHLORIDE

Eugen Reindl, Burgkirchen, and Heinz Gelbert, Margarethenberg, Upper Bavaria, Germany, assignors to Farbwerke Hoechst Aktiengesellschaft vormals Meister Lucius & Brüning, Frankfurt am Main, Germany, a corporation of Germany
No Drawing. Filed Oct. 17, 1960, Ser. No. 62,846
4 Claims. (Cl. 260—429.7)

The present invention relates to a process for the manufacture of triphenyl tin chloride.

It has already been proposed to prepare phenyl tin halides by reacting tetraphenyl tin with tin tetrachloride at temperatures ranging fom 210° to 225° C. within a period of about 8 hours. In the course of this reaction there are simultaneously obtained triphenyl tin monochloride, diphenyl tin dichloride and monophenyl tin trichloride, while always a certain portion of the tetraphenyl tin does not participate in the reaction and is incorporated in the reaction product in unconverted form at the end of the reaction. When tetraphenyl tin and tin tetrachloride are applied in the molar ratio of 3:1, the reaction proceeds substantially according to the equation

$$3Sn(C_6H_5)_4 + SnCl_4 \rightarrow 4Sn(C_6H_5)_3Cl$$

However, also in this case the conversion is never complete for which reason the crude melt obtained must be extracted or recrystallized with suitable solvents in order to obtain the pure triphenyl tin monochloride. Moreover, the tetraphenyl tin applied must be entirely anhydrous so that no decomposition can take place with the splitting off of benzene. Since the tetraphenyl tin has a melting point of 226° C. and is very voluminous, it takes a comparatively long time until the quantity necessary for the aforementioned conversion has been sintered and fused so that local overheatings and undesired thermal decompositions frequently take place. The isolation of the desired triphenyl tin monochloride by working up the melt which still contains about 10 to 15 percent of unconverted tetraphenyl tin and 2 to 5 percent of diphenyl tin dichloride is a tedious and lengthy procedure.

Now we have found that pure triphenyl tin monochloride, hereinafter designated as triphenyl tin chloride, is obtained, while avoiding the aforementioned difficulties, by converting tetraphenyl tin with tin tetrachloride in a molar ratio of about 3:1 at temperatures below 225° C., when the reaction is carried out in organic solvents that are inert towards the reactants, in which solvents the triphenyl tin chloride formed is dissolved at the reaction temperatures while the unconverted tetraphenyl tin remains practically undissolved, and by isolating the triphenyl tin chloride at the end of the reaction by crystallization from the solution obtained by separating the uncovered tetraphenyl tin.

The process according to the invention has the advantage that, for the dehydration and conversion of the tetraphenyl tin that is sensible to heat, it is not necessary to apply temperatures situated above 200° C. and almost approaching the melting point of tetraphenyl tin, as is the case with the known process. It is sufficient to carry out the dehydration and the conversion at temperatures that do not exceed the boiling temperature of the organic solvent applied, said boiling temperature being in general situated considerably below 200° C., preferably below 150° C. The water contained in the tetraphenyl tin is removed by distillation at the beginning of the conversion, in many instances by azeotropic distillation. This type of dehydration is not only much more careful, but saves much more time than the known dehydration by heating without solvents to temperatures above 200° C. Working in a boiling solvent furthermore has the advantage that, depending on the choice of the solvent, the desired reaction temperature can be adjusted without difficulty and maintained throughout the whole reaction process. Since after the termination of the reaction the unconverted tetraphenyl tin can be separated from the hot solution by filtration and the pure triphenyl tin chloride is obtained from the filtrate, also the working up of the reaction solution is very simple and easy.

It is obvious that when effecting the conversion at the low temperatures indicated, this not only entails a considerable saving of energy but also a much better yield since losses of tetraphenyl tin by thermal decomposition almost do not occur.

The preferred temperature range for carrying out the process of the invention lies between about 100° and 150° C. However, the reaction can also be carried out at temperatures lower than 100° C. The reaction can, of course, also be carried out at temperatures above 150° C., for example up to 200° C. or even at higher temperatures although, in general, no advantage is gained thereby for the reasons cited above.

As solvents, all organic solvents are suited in which triphenyl tin chloride is readily soluble in the heat, but in which tin tetraphenyl is insoluble, and which solvents are inert towards the reactants. Accordingly, a plurality of organic solvents may be used, among others benzene, toluene, xylene, chlorobenzene, ethylene chloride, trichloro ethylene, chloroform, carbon tetrachloride, methylene chloride, paraffin hydrocarbons such as hexane, heptane, octane, decane, dodecane, furthermore cyclohexane, methyl cyclohexanes, hexachlorocyclohexane, n-dibutyl ether, tetrahydrofurane, also mixtures of these compounds, for example commercial hydrocarbon mixtures such as light gasolines, arsol, xylene mixtures etc. The reaction can also be carried out in pressure vessels under pressure with solvents boiling at a temperature below 100° C., such as ethylene chloride, methylene chloride, benzene and the like. In these cases, pure triphenyl tin chloride can be obtained in even larger yields.

Tetraphenyl tin is very sparingly soluble in all the aforementioned solvents even at higher temperatures while, vice versa, triphenyl tin chloride is very readily soluble in these solvents in the heat and diphenyl tin dichloride still remains in solution in high concentrations even in the cold.

The reaction product thus obtained is suitably worked up in a manner such that the unconverted, insoluble tetraphenyl tin is first removed by filtration and the filtrate obtained is concentrated until the triphenyl tin chloride precipitates, which is then likewise separated from the mother liquor by filtration. The mother liquor and the tetraphenyl tin fraction separated during the first filtration are added to the starting products of a new batch for renewed conversion.

Triphenyl tin chloride has gained importance as an intermediate product for plant protective agents containing tin.

The following examples serve to illustrate the invention, but they are not intended to limit it thereto:

Example 1

A total quantity of 628 grams of tetraphenyl tin in 1600 cc. of xylene was reacted with 180 grams of tin tetrachloride in four batches, as follows:

In the first batch, 200 grams of tetraphenyl tin in 400 cc. of xylene were reacted with 45 grams of tin tetrachloride at 140° C. The unreacted tetraphenyl tin was filtered off, the filtrate was concentrated to one-tenth of its volume by distilling off the xylene until triphenyl tin chloride crystallized out, and the crystals were separated from the mother liquor.

In the second batch the unreacted tetraphenyl tin and the separated mother liquor of batch 1 were charged with fresh tetraphenyl tin, fresh xylene and fresh tin tetrachloride and the reaction was carried out at 140° C. under reflux. The unreacted tetraphenyl tin was again separated, the filtrate was concentrated and the triphenyl tin chloride crystals formed were obtained by filtration from the mother liquor.

The operation was carried out in the same manner with the third and fourth batch so that, in each case, the unreacted tetraphenyl tin and the separated mother liquor of the preceding batch were reacted with fresh tetraphenyl tin, xylene and tin tetrachloride.

After the fourth batch, a total of 610 grams of triphenyl tin chloride was obtained while 55 grams of tetraphenyl tin remained unreacted and the mother liquor of the last batch contained 83 grams of diphenyl tin dichloride. The yield of triphenyl tin chloride amounted to 88.5 percent of the theoretical yield, calculated on the reacted tetraphenyl tin.

*Example 2*

274 grams of tetraphenyl tin were dehydrated in an autoclave without the application of pressure by separating the water by azeotropic distillation with 300 cc. of ethylene chloride whereby 18 grams of water were separated. Then 78 grams of tin tetrachloride were added and the reaction mixture was heated in the closed vessel to 120° C. The pressure rose to about 3 atmospheres gage. After a reaction time of several hours the reaction mixture was cooled off to 20° C. and, after the addition of an additional 200 grams of ethylene chloride, the insoluble tetraphenyl tin was filtered off, the yield amounting to 25 grams (9.6 percent of the theoretical yield). The mother liquor was concentrated by evaporation and the remaining residue was washed with a little ethylene chloride. After drying, 243 grams of pure triphenyl tin chloride were obtained which represented 81.0 percent of the theoretical yield, calculated on the tetraphenyl tin reacted. The ethylene chloride used for washing contained mainly diphenyl tin dichloride.

*Example 3*

17 kilos of tetraphenyl tin (water content about 9 percent) in 30.5 kilos of xylene were charged with agitation to a vessel (capacity: 150 liters) of an acid-resisting steel alloy, the reaction mixture was dehydrated by azeotropic distillation, as indicated in Example 2. Then 5 kilos of tin tetrachloride were added and the mixture was heated for 20 hours under reflux to the boiling temperature of the xylene (about 144° C.). Then the unreacted, undissolved tetraphenyl tin (7.4 kilos=43.5 percent of the batch) was filtered in the heat, then 28.2 kilos of xylene were distilled from the filtrate and the mother liquor was allowed to cool off, while 9.2 kilos of pure triphenyl tin chloride separated (yield: 80 percent of the theoretical yield, calculated on the reacted tetraphenyl tin). The mother liquor separated from the triphenyl tin chloride which, in addition to a small quantity of dissolved triphenyl tin chloride also contained a small quantity of diphenyl tin dichloride, was used for new batches, the same as the unreacted tetraphenyl tin that had been filtered off, i.e. the mother liquor, after the addition of fresh amounts of tetraphenyl tin, solvent and tin tetrachloride, was reconducted to the reaction vessel.

We claim:

1. A process for the manufacture of triphenyl tin chloride by reacting tetraphenyl tin with tin tetrachloride in the molar ratio of about 3:1 at temperatures below 225° C., which comprises effecting the reaction in an organic solvent solution which is inert to the reactants, in which solvent solution the triphenyl tin chloride formed is dissolved at the reaction temperatures while the unreacted tetraphenyl tin remains practically undissolved, separating the unreacted tetraphenyl tin from said solvent solution, and isolating the triphenyl tin chloride at the end of reaction by crystallization from said solvent solution.

2. A process as claimed in claim 1, wherein the reaction is carried out at temperatures within the range of 100° to 150° C.

3. A process as claimed in claim 1, wherein the reaction is carried out under pressure in solvents boiling below 100° C.

4. The process of claim 1, in which the unreacted tin tetraphenyl and the solvent separated from the crystallized triphenyl tin chloride but still containing some dissolved triphenyl tin chloride is recycled to the reaction together with a fresh supply of tin tetraphenyl, tin tetrachloride and solvent.

References Cited in the file of this patent

UNITED STATES PATENTS 2,599,557     Johnson et al. _____ June 10, 1952

OTHER REFERENCES

Kozeschkow: "Berichte" 66, 1661–1665 (1933).